(12) United States Patent
Wolf et al.

(10) Patent No.: US 9,186,648 B2
(45) Date of Patent: Nov. 17, 2015

(54) CORRUGATED PACKING GRID AND STRUCTURED PACKING ASSEMBLED FROM SEVERAL PACKING GRIDS

(75) Inventors: Armin Wolf, Nordhalben (DE); Markus Lehner, Marktrodach (DE); Werner Geipel, Steinwiesen (DE)

(73) Assignee: RVT PROCESS EQUIPTMENT GMBH, Steinwiesen (DE)

( * ) Notice: Subject to any disclaimer, the term of this patent is extended or adjusted under 35 U.S.C. 154(b) by 620 days.

(21) Appl. No.: 13/505,413

(22) PCT Filed: Nov. 3, 2010

(86) PCT No.: PCT/EP2010/006705
§ 371 (c)(1),
(2), (4) Date: Jun. 15, 2012

(87) PCT Pub. No.: WO2011/054504
PCT Pub. Date: May 12, 2011

(65) Prior Publication Data
US 2012/0248635 A1     Oct. 4, 2012

(30) Foreign Application Priority Data
Nov. 5, 2009 (DE) .......... 10 2009 052 045

(51) Int. Cl.
*B01J 19/32* (2006.01)
*F28F 13/12* (2006.01)
*F28F 25/08* (2006.01)

(52) U.S. Cl.
CPC ............. *B01J 19/32* (2013.01); *F28F 13/12* (2013.01); *F28F 25/085* (2013.01); *B01J 2219/3221* (2013.01); *B01J 2219/32227* (2013.01);

(Continued)

(58) Field of Classification Search
USPC .................................... 261/94–98
See application file for complete search history.

(56) References Cited

U.S. PATENT DOCUMENTS 4,304,738 A   12/1981 Nutter
5,543,088 A * 8/1996 Halbirt ............. 261/94
(Continued)

FOREIGN PATENT DOCUMENTS

CN   1218175 A   6/1999
CN   1264616 A   8/2000
(Continued)

OTHER PUBLICATIONS

International Preliminary Report on Patentability (PCT/IB 373) issued on May 8, 2012, by the European Patent Office as the International Searching Authority for International Application No. PCT/EP2010/006705.

(Continued)

*Primary Examiner* — Duane Smith
*Assistant Examiner* — Adam W Bergfelder
(74) *Attorney, Agent, or Firm* — Buchanan Ingersoll & Rooney PC

(57) ABSTRACT

A corrugated packing grid with consecutively arranged wave crests and wave troughs for a structured packing, which is assembled from several packing grids, for gas-liquid contacting apparatuses, and a packing assembled from the packing grids. The packing grid and the packing have a large mass transfer area and a low pressure drop at the same time and offer a high mechanical strength. This can be achieved in that elements lie in the region of the wave troughs of the packing grid, the elements extending into the wave troughs.

20 Claims, 2 Drawing Sheets

(52) U.S. Cl.
CPC ............... *B01J2219/32237* (2013.01); *B01J 2219/32286* (2013.01); *B01J 2219/32483* (2013.01)

(56) References Cited

U.S. PATENT DOCUMENTS

| | | | |
|---|---|---|---|
| 5,629,258 | A | 5/1997 | Suess et al. |
| 5,882,772 | A * | 3/1999 | Schultes .................. 428/174 |
| 6,096,407 | A | 8/2000 | Vodicka et al. |
| 6,206,350 | B1 | 3/2001 | Harrison et al. |
| 6,409,378 | B1 | 6/2002 | Kessler |
| 6,676,286 | B2 | 1/2004 | Grütter et al. |
| 2002/0060951 | A1 | 5/2002 | Gruetter et al. |
| 2010/0213625 | A1 | 8/2010 | Raynal et al. |

FOREIGN PATENT DOCUMENTS

| | | |
|---|---|---|
| CN | 1286389 A | 3/2001 |
| DE | 2 060 178 A1 | 11/1971 |
| DE | 195 37 690 A1 | 4/1997 |
| DE | 197 33 480 A1 | 2/1999 |
| DE | 101 55 045 A1 | 8/2002 |
| DE | 10 2005 011 228 A1 | 9/2006 |
| EP | 0 158 917 A2 | 10/1985 |
| EP | 0 671 207 A1 | 9/1995 |
| FR | 2 913 353 A1 | 9/2008 |

OTHER PUBLICATIONS

German Office Action issued on Jul. 29, 2010 for Application No. DE 10 2009 052 045.7.
International Search Report (PCT/ISA/210) issued on Jan. 25, 2011, by European Patent Office as the International Searching Authority for International Application No. PCT/EP2010/006705.
Written Opinion (PCT/ISA/237) issued on Jan. 25, 2011, by European Patent Office as the International Searching Authority for International Application No. PCT/EP2010/006705.
First Office Action issued on Nov. 20, 2013, by the Chinese Patent Office in corresponding Chinese Application No. 2010800498924, and an English Translation of the Office Action. (8 pages).

* cited by examiner

CORRUGATED PACKING GRID AND STRUCTURED PACKING ASSEMBLED FROM SEVERAL PACKING GRIDS

The present invention relates to a corrugated packing grid with consecutively arranged wave troughs and wave crests for a structured packing assembled from several packing grids for gas-liquid contacting apparatuses, wherein in the region of the wave troughs of the packing grid, elements are arranged which extend into the wave troughs. The present invention furthermore also relates to a structured packing assembled from several packing grids.

Gas-liquid contacting apparatuses are used for rectification, absorption, desorption and for heat transfer in the process industry, that means for example in chemistry, in petrochemistry, in the refinery field and in environmental technology. Their technical relevance can be illustrated by the number of operated apparatuses; for example in the USA alone, more than 40,000 distillation columns are operated, while the number of absorption columns employed in exhaust gas purification is clearly higher.

To achieve a high mass transfer performance in these apparatuses, a large interface between the phases must be realized. In industrial practice, various basic types of contacting elements have established themselves: trays, e.g. sieve, valve, or bubble-cap trays, random packed beds and structured packings. Columns with random tower packings and structured packings are combined under the generic term packing columns. In packing columns, the liquid charged through corresponding liquid distributors flows over the surface of the random packed bed or the structured packings, respectively. In conventional structured packings used to date in the industrial practice, the liquid forms a film on the packing and thus offers a large mass transfer area for the onflowing gas. In random packings, there is a trickle flow of the liquid in most cases.

Structured packings have been employed for more than 30 years now. Vertical, parallel layers of folded thin sheet metals or plastic surfaces have gained acceptance, the foldings forming, from layer to layer, a changing though symmetrical angle to the vertical line. A packed bed consists of several superimposed layers of these vertical parallel layers of a height of about 20 cm each which are each rotated by 90° with respect to each other.

Such a structured packing is known, for example, from EP 0 158 917 A 2. Here, the folded thin sheet metals are provided with slots which are introduced into the still flat sheet metal before they are folded and spread open during folding. It is moreover described that regions of the sheet metals are cut out so that they are still partially connected to the sheet metal and bent to the outside.

DE 2 060 178 shows a similar structured packing. As a material for the individual elements of the packing, expanded metal provided with waves is employed. Regions are cut out of the expanded metal such that they are still partially connected with the expanded metal. These regions are pressed out of the surrounding material, so that additional passage openings are formed.

Another layer or another in-built element for a structured packing is known from DE 195 37 690 A1. The in-built element comprises a plurality of transfer areas which are embodied by the surface of wavelike strips. The wavelike strips are shifted with respect to each other such that the wave troughs of one strip lie next to the wave crests of the adjacent strip. By this, a more uniform distribution of the liquid in the structured packing is achieved. However, it is here disadvantageous that such a structured packing comprises a largely closed plate structure and the transverse transfer within the packing elements is therefore restricted. Due to the resulting narrow channels in the structured packing, the packings react sensitively to soiling. Due to the largely closed structure, the hydraulic load capacity of these packings is furthermore limited. The amount of material required for the manufacture of such packings, and consequently the production costs, are relatively high.

A similar structured packing is known from FR 2 913 353. The structured packing is composed of corrugated plates, wherein flow channels are formed by the waves of adjacent plates. Regions are cut out of the wavelike plates such that they are still partially connected with the respective plate. These regions are bent out of the plates and project into the flow channels. So, in the plan view, these plates form a closed surface and therefore have, at least in one direction, a relatively closed structure.

From DE 197 33 480 A 1, an in-built packing for wet cooling towers is furthermore known. The in-built packing comprises several adjacent wave- and grid-like in-built elements. The in-built elements comprise parallel longitudinal struts and zigzag parallel cross struts which embody channels formed by the waves and extend at an angle to the vertical. Between two adjacent longitudinal struts and two adjacent cross struts each, diagonal struts are arranged which form cross-shaped reinforcements. The adjacent in-built elements are arranged to be rotated with respect to each other so that their channels intersect. In packings developed for wet cooling towers, it is disadvantageous that they are designed for the specific requirements in the cooling towers. In particular with very high gas and liquid loads, the packings produce comparably high pressure drops. The packings are therefore not suited for high liquid loads (amount of liquid per cross-sectional area of the apparatus, in $m^3/m^2h$). Moreover, the mechanical strength of these packings is highly restricted as cooling towers have packed beds of a height of only 1 to 2 m, while in gas-liquid contacting apparatuses in the process industry, packed beds of a height of up to 10 m are common.

It is therefore the object of the present invention to provide a structured packing for gas-liquid contacting apparatuses, such as mass transfer columns, which avoids the above-described disadvantages of the packings known from prior art. In particular, a packing grid or a structured packing is to be provided which offers a large mass transfer area, while it still has a low pressure drop and high stability or high mechanical strength, respectively.

According to the invention, this object is achieved by the wave crests and the wave troughs being formed by wavelike bands, the wavelike bands being arranged at distances to each other and being connected via cross struts extending transversely to the bands to form an open structure.

By the elements projecting into the wave troughs, the surface of the packing grid is enlarged. By this, a large contact area for the contact between gas and liquid and thus a large mass transfer area are created. Conditioned by the grid shape of the packing grid, an open structure is created which leads to a low pressure drop. By the consecutively arranged wave troughs and wave crests with the elements projecting into the wave troughs, it is avoided that flow channels form in the packing through which the liquid would quickly flow off. Moreover, a simple manufacture of the packing grid is permitted. The strength of the packing grid is increased, it is in particular avoided that the packing grids buckle under loads. So, the packing grid is embodied by the wavelike bands and the cross struts extending transversely to them. Due to the open structure of the packing grid, a good transverse transfer between adjacent packing grids and thus an improved mass transfer performance of a packing assembled from the packing grids are permitted. Moreover, such a packing comprises a high hydraulic capacity, so that a very high load of the packing with gas and liquid is permitted. The open structure of the packing grids and thus also of the packing manufactured from the packing grids furthermore leads to a low sensitivity against soiling. Thus, even in systems with a tendency to soiling, higher service lives are possible. Moreover, the amount of material required for the manufacture of the packing grids becomes lower, whereby manufacturing costs are relatively low.

In a further advantageous embodiment, it can be provided to have the wavelike bands extend in parallel to each other and the cross struts arranged transversely to the bands also extend in parallel to each other. Therefore, in the packing grids, continuous wave crests and wave troughs are created along which the liquid is conducted in a film or trickle flow, respectively.

Advantageously, it can be furthermore provided that the elements extending into the wave troughs are arranged in the regions of the packing grid situated between the wavelike bands. By this, the free areas arranged in the direction of the flow of the liquid are reduced, the mass transfer area is enlarged, and improved transverse transfer between adjacent packing grids takes place.

In still a further embodiment, it can be provided that the elements extending into the wave troughs are partially embodied as bows which extend oppositely to the wave troughs to the outside. By this, both the contact area of the packing grid and stability or mechanical strength are further increased.

It can be moreover provided that the elements extending into the wave troughs are partially embodied as webs extending to the front side or back side of the packing grid. Since the elements extending into the wave troughs are only partially embodied as webs, these webs are not continuous but interrupted. By this embodiment of the packing grid, the desired flow in the packing grid, that is a mixture of film flow and trickle flow, is achieved. At the ends of the webs, liquid drops are formed which improves the turbulence and by which a constant renewal of the phase interface is achieved. This leads to an improved mass and heat transfer.

In a preferred embodiment, it can be provided that the bows and webs extending into the same wave trough of the packing grid are arranged alternately in the regions situated between the wavelike bands. Therefore, in each wave trough, bows and webs are alternately formed. The bows are preferably narrower than the distance between two adjacent wavelike bands. Therefore, a distance between the adjacent webs and bows is formed. The liquid flowing through the packing or the packing grid, respectively, therefore forms drops at the ends of the webs which fall from there onto the bows and break up at the bows or at other regions of the packing grid. As already described, a constant renewal of the phase interface, an improved turbulence and an improved mass and heat transfer is permitted by this.

Still another embodiment provides that the cross struts connect the wavelike bands extending in parallel to each other at the wave crests, the wave troughs and the reversal points situated between the wave crests and the wave troughs. By this, the desired open structure of the packing grid is obtained.

A further increase of the surface of the packing grid and a high stability can be achieved by the cross struts being elongated to the front side and/or the back side of the packing grid.

Preferably, it can be provided that the cross struts situated in the reversal points of the wavelike bands are elongated in the direction to the front side and to the back side of the packing grid. Thereby, these cross struts project into the wave troughs formed on the front side as well as those formed on the back side of the packing grid.

Advantageously, it can also be provided that the cross struts arranged at the wave crests or the wave troughs, respectively, are only elongated in the direction to the back side or only in the direction to the front side of the packing grid. This also has the advantage that the surface of the packing grid is enlarged.

Still another embodiment provides that cross struts arranged in the same wave trough at the reversal points of the wavelike bands comprise arms that diagonally project into the wave trough to the outside and which join the arms of the cross struts lying opposite in the respective wave trough and form the bows. These arms include an angle of about 30° to 60° with a straight line extending perpendicularly to the front side of the packing grid. The formed cross channel structure prevents free flow sections through which liquid could flow off quickly from occurring. Nevertheless, the packing grid has a permeable structure. Preferably, the bows project to the front side or the back side of the packing grid. This permits a good connection between two adjacent packing grids. Tests showed that at these contact points between two adjacent packing grids, in contrast to packing layers embodied by closed foils, no aggravation of the flow behavior, such as flooding, occurs. Due to the open structure of the packing grids, these contact points do not have a negative influence.

An improvement of the stability or the mechanical strength can be achieved by the cross struts lying in the wave troughs or at the wave crests, respectively, comprising supports which, in the wave troughs, project in the direction of the front side or the back side of the packing grid and are connected with the bows.

Advantageously, it can be furthermore provided that the wavelike bands include an angle of about 30° to 60° with a straight line lying in the plane of the packing grid and extending perpendicularly to the longitudinal extension of the packing grid, and the cross struts include an angle of about 30° to 60° with this straight line lying in the plane of the packing grid and extending perpendicularly to the longitudinal extension of the packing grid. Tests showed that this permits a particularly good flow behavior and thus an improved mass and heat transfer. The plane of the packing grid means a plane formed in parallel to the front side and back side of the packing grid.

Advantageously, it can be furthermore provided that the packing grid consists of plastics. This permits a simple manufacture, for example by injection molding.

The invention furthermore also relates to a structured packing for gas-liquid contacting apparatuses. Here, too, it is the object of the present invention to provide a structured packing which avoids the disadvantages of the structured packings known from prior art and in particular offers a large mass transfer area with a low pressure drop and high mechanical strength at the same time.

For this, it is provided that the structured packing comprises a plurality of adjacent packing grids embodied as described above, wherein adjacent packing grids are each arranged to be rotated with respect to each other.

By this, it is achieved that the packing provides a large area and thus a large contact area between gas and liquid. By this, the packing provides a large mass transfer area, the heat and mass transfer is improved.

Below, the invention will be illustrated more in detail with reference to drawings. In the drawings.

Figure 1:
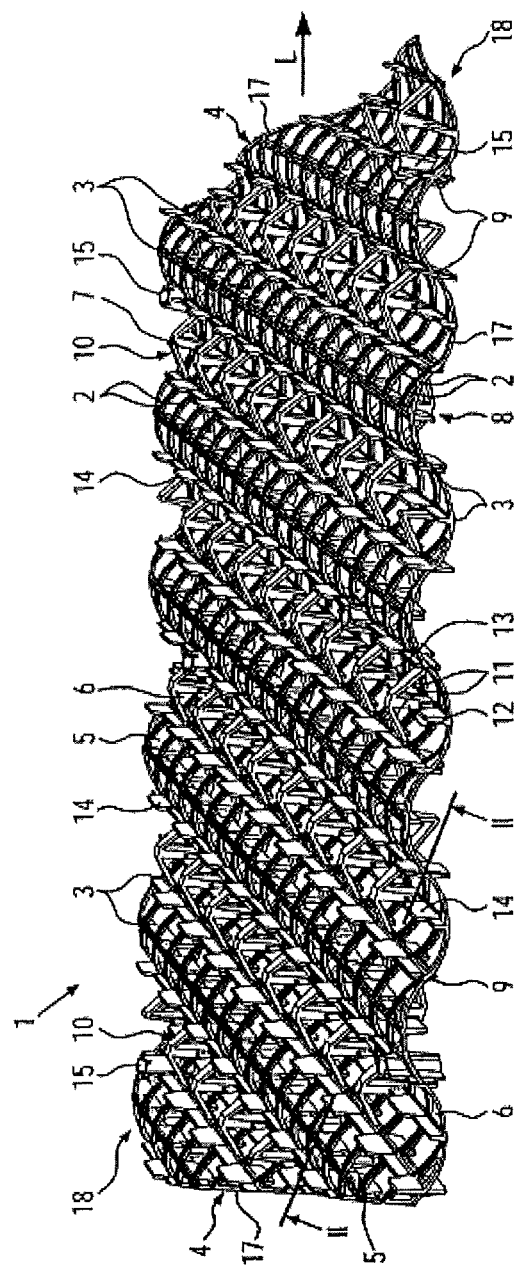
FIG. 1 shows a perspective representation of a packing grid.

FIG. 1 shows a perspective view of the packing grid 1. The packing grid 1 has the basic shape of a rectangular plate and therefore comprises a front side 7, a back side 8, two narrow sides 4, two longitudinal sides 18 and a thickness d. The packing grid 1 is corrugated and provided with wave crests 5 and wave troughs 6 extending transversely to its longitudinal extension L. By the wave crests 5 and wave troughs 6, grooves are formed in the packing grid 1. As a material for the packing grid 1, plastic is preferably employed.

Below, the front view or the front side 7 of the packing grid 1 is described. The corrugated packing grid 1 has a periodically repeated structure. That means the consecutive waves of the packing grid 1 are essentially embodied identically. Moreover, the individual half-waves of one wave of the packing grid are point-symmetric to the reversal point of the wave. The back side 8 of the packing grid 1 is therefore embodied essentially identically to the front side 7. The wave crests of the front side 7 therefore form the wave troughs of the back side 8 and vice versa.

The grid structure of the packing grid 1 is generated by a plurality of wavelike bands 2 and cross struts 3 extending transversely to the bands 2. A surrounding frame 17 is embodied at the edges of the packing grid. Elements extending into the wave troughs 6 are arranged in the wave troughs 6 of the packing grid 1 on the front side 7 as well as on the back side 8 of the packing grid 1.

In the represented embodiment, the wavelike bands 2 are arranged in parallel to each other. Thus, the wave crests of adjacent wavelike bands 2 lie next to each other. The wave troughs of a wavelike band 2 also lie next to the wave troughs of the adjacent wavelike bands 2. Moreover, the wavelike bands 2 are arranged at distances from each other. The distance between two adjacent wavelike bands 2 is preferably always the same. Preferably, the wavelike bands 2 have a sine-wave form. However, it is also possible for the bands 2 to have a different wave form.

The adjacent wavelike bands 2 are connected to each other via cross struts 3. The cross struts 3 preferably extend perpendicularly to the wavelike bands 2. The cross struts 3 are arranged at the wave crests 5, in the wave troughs 6 and at the reversal points 9 of the wavelike bands 2 arranged between the wave crests 5 and the wave troughs 6. The wavelike bands 2 include an angle of about 30° to 60°, preferably 30°, with a straight line extending perpendicularly to the longitudinal extension L and in parallel to the narrow sides 4 of the packing grid 1. The cross struts 3 form an angle of about 30°-60°, preferably 30° with this straight line extending perpendicularly to the longitudinal extension L of the packing grid 1. Since the packing grids 1 are installed such that they stand vertically on one of their longitudinal sides 18, this straight line corresponds to the vertical line.

The cross struts 3 are elongated in the direction to the front side 7 and/or the back side 8 of the packing grid 1. Therefore, the cross struts 3 are shaped like ribs. The elongations of the cross struts 3 essentially extend perpendicularly to a plane extending in parallel to the front side 7 of the packing grid 1. By the elongations, the surface of the packing grid 1 is enlarged and the mechanical strength improved. To facilitate the manufacture of the packing grids 1—the packing grids are preferably injection-molded—the cross struts 3 taper towards the front side 7 or back side 8.

The cross struts 3.1 lying in the reversal points 9 of the wavelike bands 2 extend in the direction to the front side 7 as well as in the direction to the back side 8 of the packing grid 1. The cross struts 3.3 which are arranged in the wave troughs 6 on the front side 7 of the packing grid 1 extend in the direction of the front side 7 of the packing grid into the wave troughs. The cross struts 3.2 which are arranged at the wave crests 5 of the front side of the packing grid 1 extend in the direction of the back side 8 of the packing grid, so that they project into the wave troughs embodied on the back side 8 of the packing grid 1.

At the packing grid 1, bows 10 are furthermore formed which extend from the wave troughs 6 oppositely to the wave troughs 6 to the outside. The bows 10 are connected with the cross struts 3 and arranged in the regions of the packing grid 1 lying between the wavelike bands 2. These bows 10 are preferably only arranged in every second one of the regions lying between the wavelike bands 2. In each wave trough 6, arms 11 extend from the cross struts 3.1 arranged at the reversal points 9 of the wavelike bands 2 into the respective wave trough 6. The arms 11 of the two cross struts 3.1 associated to a wave trough 6 and lying in the reversal points 9 extend in the wave trough 6 to the outside and butt with the respective opposite arms 11 at one point. The cross strut 3.3 which is arranged in the corresponding wave trough 6 comprises supports 12 which extend from the wave trough 6 perpendicularly upwards to the front side 7 of the plate-like packing grid 1 and are connected at the contact point of the arms 11 arranged in the same intermediate region between the wavelike bands with the latter. The bows 10 are thus formed by the arms 11 and supported from the bottom by the supports 12. Each contact point 13 between the two arms 11 and the support 12 at the front side 7 or the back side 8 of the packing grid 1, respectively, is flattened and forms a flat contact surface.

As was already described, the bows 10 formed by the arms 11 and the supports 12 are only arranged in every second one of the regions of the packing grid 1 lying between the wavelike bands 2. In the other regions, the cross struts 3 are elongated to projecting webs 14. The webs 14 extend perpendicularly to the front side 7 of the plate-like packing grid 1. The webs 14 each have a distance from each other which corresponds to the distance of the adjacent wavelike bands 2. In the wave troughs 6, the webs 14 extend only to about half the height of a wave trough 6. The supports 12, which project from the cross struts 3 lying in the wave troughs 6 to the top or to the bottom, respectively, are narrower than the distance between two adjacent wavelike bands 2. The webs 14 arranged in the wave troughs 6 therefore have a distance to the supports 12. Due to the thin-walled webs 14, the surface of the packing grid 1 is enlarged, the supports 12 are stable and increase the mechanical strength of the packing grid 1.

The packing grid 1 comprises, adjacent to its narrow sides 4 and in the center, two clipping elements 15 each which cooperate with the clipping elements 15 of a further packing grid, so that several packing grids can be connected to each other to form a structured packing.

At the wavelike bands 2, continuous reinforcing ribs are arranged at the free surfaces. The packing grids are preferably made of plastic. By the reinforcing ribs, the required stability or mechanical strength is then achieved. At the cross struts arranged at the wave crests or in the wave troughs, respectively, such reinforcing ribs are also arranged each at the outer surface of the packing grid.

Figure 2:
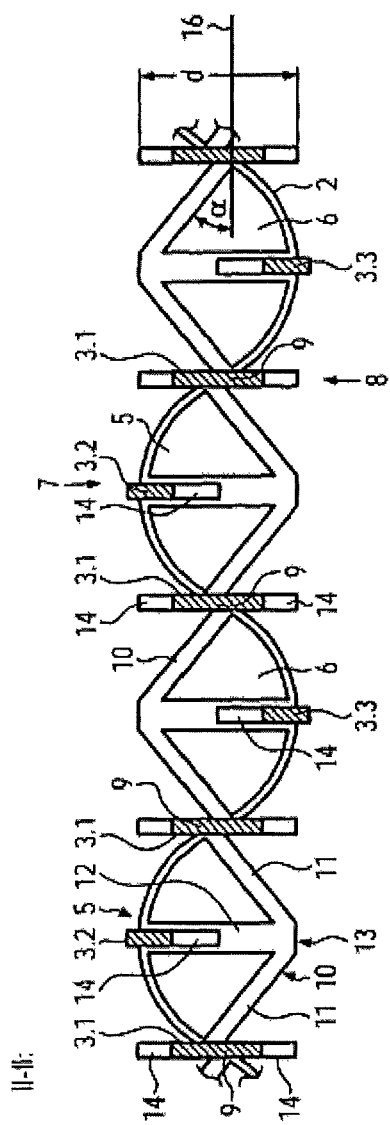
FIG. 2 shows the view of the packing grid from the direction II-II in FIG. 1 (detail).

In FIG. 2, a detail of the packing grid 1 as seen from the direction of line II-II in FIG. 1 is represented. This view is a view parallel to the wavelike bands 2. The wavelike bands 2 are arranged in parallel to each other, they thus lie one behind the other in the representation of FIG. 2. By the wave shape of the bands 2, the wave crests 5 or wave troughs 6, respectively, of the wavelike packing grid 1 are formed. The wave crests 5 of the front side 7 of the packing grid 1 form wave troughs on the back side 8 of the packing grid 1. Conversely, the wave troughs 6 arranged on the front side 7 of the packing grid 1 form wave crests on the back side 8 of the packing grid 1. The wavelike bands 2 essentially have the shape of a sinusoid. However, they can also have another wavelike course. At the wave crests 5, the wave troughs 6 and the reversal points 9 lying between them, the wavelike bands 2 are connected with cross struts 3.

As can be clearly seen in FIG. 2, the packing grid 1 comprises elements which project into the wave troughs 6. For this, the cross struts 3.1 arranged at the reversal points 9 of the wavelike bands 2 are on the one hand elongated like ribs in the direction to the front side 7 and to the back side 8. The cross struts 3.3 arranged in the wave troughs 6 are elongated like ribs in the direction to the front side 7 of the packing grid. Equally, the cross struts 3.2 arranged at the wave crests 5 are elongated like ribs in the direction to the back side 8 of the packing grid 1. In every second one of the regions lying between the wavelike bands 2 of the packing grid, the cross struts 3 are moreover elongated to the webs 14. This is true for the cross struts 3.1 lying at the reversal points 9 as well as for the cross struts 3.2, 3.3 lying at the wave crests 5 or in the wave troughs 6, respectively.

At the cross struts 3.1 lying in the reversal points 9, the webs 14 are embodied in the direction to the front side 7 as well as in the direction to the back side 8. The webs 14 are high enough to reach the front side 7 and the back side 8 of the packing grid 1.

The webs 14 embodied at the cross struts 3.3 arranged in the wave troughs 6 extend in the direction to the front side of the packing grid 1 approximately to half the thickness d of the packing grid 1. The webs 14 formed at the cross struts 3.2 arranged at the wave crests 5 only extend in the direction of the back side 8 of the packing grid 1 and reach approximately to half the thickness of the packing grid 1.

As was already described, these webs 14 at the cross struts 3 are only arranged in every second, that means e.g. in the first, in the third, etc., region of the packing grid 1 lying between the wavelike bands 2. In the regions lying between them, that means e.g. in the second, in the fourth, etc. region, bows 10 are embodied in the packing grid 1. The bows 10 extend into the wave troughs 6 and are each arched to the outside, that means opposite to the wave troughs 6 where they are arranged. The bows 10 are composed of the two arms 11. The arms 11 each start from the cross struts 3.1 arranged at the reversal points 9. The two opposed arms 11 of the two cross struts 3 associated to one wave trough extend at an angle into the respective wave trough 6 to the outside and join each other there at a contact point 13. The arms 11 include an angle a within a range of about 30° to about 60° with a plane 16 extending in parallel to the front side of the packing grid 1.

Starting from the cross struts 3.2, 3.3 lying in the wave troughs 6 or at the wave crests 5, respectively, the support 12 extends perpendicularly out of the wave trough 5 and joins the two arms 11 in the contact point 13. This contact point 13 is preferably flattened, so that packing grids 11 arranged adjacently can support themselves at these contact points 13.

The bows 10 which are arranged in the wave troughs 6 located on the back side 8 of the packing grid 1 are arranged at the cross struts 3 vertically slightly offset with respect to the bows 10 which are arranged in the wave troughs 6 located on the front side 7 of the packing grid 1. By this, interruptions are generated and liquid trickling along the bows can be directed to new paths.

To manufacture a structured packing for gas-liquid contacting apparatuses, several ones of the packing grids 1 are arranged one next to the other in a rotated manner and connected to each other by means of the clipping elements 15.

Adjacent packing grids 1 are preferably rotated by 180° about an axis extending in parallel to the longitudinal extension L of the packing grid 1. Thus, the wavelike bands 2 and the cross struts 3 of adjacent packing grids 1 intersect.

The packing grid 1 consists of plastic. Preferably, the packing grid 1 is manufactured by injection molding.

The essential technical properties of the packing grids or the structured packings made from them, respectively, are their specific surfaces ($m^2/m^3$) influencing the heat and mass transfer performance and the resistance to the gas-liquid countercurrent exerted by the packing which influences energy consumption (pressure drop) and the hydraulic capacity. By changing the geometric dimensions (width, wavelength, amplitude) of the wavelike bands of the packing grid, different specific surfaces can be easily adjusted. By the open grid structure of the packing grid, the resistance to the gas-liquid countercurrent is low.

As was represented above, the packing grid 1 according to the invention comprises an open, corrugated grid geometry. By this, the material required for the manufacture of the packing grids is considerably less than for conventional packings. Therefore, the packing grid is very cheap. The open grid structure permits very high loads with gas and liquid, thus, the new development comprises a higher hydraulic capacity. For example, gas loads (f–factors=empty gas conduit velocities multiplied by the square root of gas density) of up to 4 $Pa^{0.5}$ and liquid loads of up to 60 $m^3/m^2h$ are possible.

Due to the open structure of the packing grids, the transition between two packing layers does not have a limiting effect on the gas and liquid load. The sensitivity towards soiling is considerably reduced due to the open structure. Thereby, a higher service life of the packing can be achieved in systems tending to soiling. The transverse transfer of liquids between the packing grids is not restricted, having a positive effect on the mass transfer performance for the packing. By the grid structure of the packing grid with the elements projecting into the wave troughs, the flow form of the liquid across the packing is formed as a mixture of a film and trickle flow. By this, an improved turbulence and the constant renewal of the phase interface are achieved, leading to an improved mass and heat transfer. The structured packing produced from the packing grids can be already integrated into the horizontal column at the apparatus manufacturer's site, thus saving assembly costs on site and transport costs for the packing elements themselves.

Structured packings of the corrugated packing grids can be employed, for example, in air coolers for air separation units, in scrubbers, in particular for exhaust air or waste gas purification, in strippers, in particular for drinking and groundwater treatment, and in absorbers and strippers in chemical production factories, such as chloralkali plants or in vinyl chloride production.

The invention claimed is:

1. A corrugated packing grid for a structured packing assembled from a plurality of packing grids for gas-liquid contacting apparatus, the corrugated packing grid comprising:
   a plurality of wave-like bands arranged in parallel, each wave-like band having wave crests and wave troughs, and spaced apart from adjacent wave-like bands, wherein all of the wave crests and wave troughs of the plurality of wave-like bands are in-phase and form grooves in the packing grid extending in a packing grid plane; and
   cross struts extending transversely to the bands and forming with the bands an open structure perpendicular to the packing grid plane.

2. A packing grid according to claim 1, wherein the cross struts extending transversely to the bands extend in parallel to each other.

3. A packing grid according to claim 1, comprising:
elements arranged to extend into the wave troughs arranged in regions of the packing grid lying between the wavelike bands.

4. A packing grid according to claim 1, comprising: elements arranged to extend into the wave troughs partially formed as bows which extend opposite to the wave troughs to an outside.

5. A packing grid according to claim 4, wherein the elements extending into the wave troughs are partially embodied as webs extending to a front side or to a back side of the packing grid.

6. A packing grid according to claim 5, wherein the bows and webs projecting into a same wave trough are arranged alternately in regions lying between the wavelike bands.

7. A packing grid according to claim 2, wherein the cross struts connect the wavelike bands extending in parallel at the wave crests, the wave troughs, and reversal points lying between the wave crests and the wave troughs.

8. A packing grid according to claim 1, wherein the cross struts are elongated to a front side and/or to a back side of the packing grid.

9. A packing grid according to claim 7, wherein the cross struts lying in the reversal points of the wavelike bands extend to a front side and to a back side of the packing grid.

10. A packing grid according to claim 7, wherein the cross struts arranged at the wave crests or at the wave troughs only extend to a back side or only to a front side of the packing grid.

11. A packing grid according to claim 7, wherein the cross struts arranged in a same wave trough at the reversal points of the wavelike bands comprise:
arms diagonally projecting outside into the wave trough which join the arms of the cross strut opposed in a respective wave trough and form bows.

12. A packing grid according to claim 11, wherein the cross struts lying in the wave troughs or at the wave crests, respectively, comprise:
supports which project in the wave troughs to a front side or to a back side of the packing grid and are connected with the bows.

13. A packing grid according to claim 1, wherein the wavelike bands include an angle of about 30° to 60° with a straight line lying in a plane of the packing grid and extending perpendicularly to a longitudinal extension of the packing grid, and the cross struts include an angle of about 30° to 60° with this straight line lying in the plane of the packing grid and extending perpendicularly to the longitudinal extension of the packing grid.

14. A packing grid according to claim 1, wherein the packing grid consists of plastic.

15. A structured packing for gas-liquid contacting apparatuses with a plurality of adjacent packing grids according to claim 1, wherein adjacent packing grids are arranged each rotated with respect to each other.

16. A packing grid according to claim 2, comprising:
elements arranged to extend into the wave troughs arranged in regions of the packing grid lying between the wavelike bands.

17. A packing grid according to claim 16, comprising:
elements arranged to extending extend into the wave troughs partially formed as bows which extend opposite to the wave troughs to an outside.

18. A packing grid according to claim 17, wherein the elements extending into the wave troughs are partially embodied as webs extending to a front side or to a back side of the packing grid.

19. A packing grid according to claim 18, wherein the bows and webs projecting into a same wave trough are arranged alternately in regions lying between the wavelike bands.

20. A packing grid according to claim 19, wherein the cross struts connect the wavelike bands extending in parallel at the wave crests, the wave troughs, and reversal points lying between the wave crests and the wave troughs.

* * * * *